(12) United States Patent
Noguchi et al.

(10) Patent No.: US 8,877,090 B2
(45) Date of Patent: Nov. 4, 2014

(54) POSITIVE ELECTRODE ACTIVE MATERIAL FOR SECONDARY BATTERY, AND SECONDARY BATTERY USING THE SAME

(75) Inventors: Takehiro Noguchi, Tokyo (JP); Hideaki Sasaki, Tokyo (JP); Makiko Uehara, Tokyo (JP)

(73) Assignee: Nec Corporation, Tokyo (JP)

( * ) Notice: Subject to any disclaimer, the term of this patent is extended or adjusted under 35 U.S.C. 154(b) by 0 days.

(21) Appl. No.: 13/824,075

(22) PCT Filed: Nov. 16, 2011

(86) PCT No.: PCT/JP2011/076378
§ 371 (c)(1),
(2), (4) Date: Mar. 15, 2013

(87) PCT Pub. No.: WO2012/077472
PCT Pub. Date: Jun. 14, 2012

(65) Prior Publication Data
US 2013/0168601 A1    Jul. 4, 2013

(30) Foreign Application Priority Data
Dec. 9, 2010 (JP) .................................. 2010-274750

(51) Int. Cl.
*H01M 4/131* (2010.01)
*C01D 15/02* (2006.01)
*C01G 37/02* (2006.01)
*C01G 45/02* (2006.01)
*C01G 53/04* (2006.01)
*H01M 4/505* (2010.01)
*H01M 4/525* (2010.01)

(52) U.S. Cl.
CPC .............. *H01M 4/505* (2013.01); *Y02E 60/122* (2013.01); *H01M 4/525* (2013.01)
USPC ................ 252/182.1; 423/594.14; 423/594.4; 423/596

(58) Field of Classification Search
CPC .............................. H01M 4/525; H01M 10/04
USPC ....................................................... 252/182.1
See application file for complete search history.

(56) References Cited

FOREIGN PATENT DOCUMENTS

| JP | 9-147867 A | 6/1997 |
|---|---|---|
| JP | 11-73962 A | 3/1999 |
| JP | 2001-110417 A | 4/2001 |
| JP | 2001-176557 A | 6/2001 |
| JP | 2001-223006 A | 8/2001 |
| JP | 2002-63900 A | 2/2002 |
| JP | 2002-158008 A | 5/2002 |
| JP | 2003-68282 A | 3/2003 |
| WO | WO 2009127672 A1 * | 10/2009 |

OTHER PUBLICATIONS

English machine translation of Yamaki et al., JP 2002063900 A (2002).*
International Search Report for PCT/JP2011/076378 dated Feb. 21, 2012.

* cited by examiner

*Primary Examiner* — Peter F Godenschwager
(74) *Attorney, Agent, or Firm* — Sughrue Mion, PLLC

(57) ABSTRACT

There is provided a novel positive electrode active material for a secondary battery. A positive electrode active material for a secondary battery according to the present exemplary embodiment is represented by the following formula (I):$Li_a(Ni_xCr_yMn_{2-x-y-z}M1_z)O_4$(I) wherein $0<x$, $0<y$, $0<z$, $x+y+z<2$, and $0\leq a\leq 2$; and M1 contains at least one selected from the group consisting of Na and Mg. A positive electrode for a secondary battery according to the present exemplary embodiment has the positive electrode active material for a secondary battery according to the present exemplary embodiment. A method for manufacturing a secondary battery according to the present exemplary embodiment includes the steps of applying the positive electrode active material for a secondary battery according to the present exemplary embodiment on a positive electrode current collector to thereby fabricate a positive electrode for a secondary battery; and assembling the secondary battery by using the positive electrode for a secondary battery.

9 Claims, 2 Drawing Sheets

POSITIVE ELECTRODE ACTIVE MATERIAL FOR SECONDARY BATTERY, AND SECONDARY BATTERY USING THE SAME

CROSS REFERENCE TO RELATED APPLICATIONS

This application is a National Stage of International Application No. PCT/JP2011/076378 filed Nov. 16, 2011, claiming priority based on Japanese Patent Application No. 2010-274750 filed Dec. 9, 2010, the contents of all of which are incorporated herein by reference in their entirety.

TECHNICAL FIELD

The present exemplary embodiment relates to a positive electrode active material for a secondary battery, and a secondary battery using the same.

BACKGROUND ART

Lithium secondary batteries and lithium ion secondary batteries (hereinafter, referred to as secondary batteries) have a feature of being of a small size and having a large capacity. Therefore, secondary batteries are broadly used as power sources for cell phones, laptop personal computers and the like.

$LiCoO_2$ is mainly utilized as a positive electrode active material of the secondary battery. However, $LiCoO_2$ does not have sufficient safety in the charged state, and besides, the Co raw material is expensive. Therefore, search for novel positive electrode active materials replacing $LiCoO_2$ has been made actively.

As a material having the same lamellar crystal structure as $LiCoO_2$, use of $LiNiO_2$ is being studied. However, although $LiNiO_2$ has a high capacity, $LiNiO_2$ has a lower potential than $LiCoO_2$, and besides has a problem in the aspect of safety. Further, $LiNiO_2$ is expensive because using much amount of the Ni raw material.

As another positive electrode active material, use of $LiMn_2O_4$ having a spinel structure is being actively studied. The Mn raw material is relatively inexpensive, and therefore has a merit in price. However, $LiMn_2O_4$ has a problem of occurrence of the performance deterioration along with the cycle and the capacity decrease at high temperatures. It is believed that this is caused by the instability of trivalent Mn, and the Jahn-Teller strain is generated in the crystal when the average valence of Mn ions changes between trivalence and tetravalence, and decreases the stability of the crystal structure.

Therefore, in order to enhance the reliability of a secondary battery, studies have been made in which the structural stability is improved by substituting trivalent Mn with another element. For example, Patent Literature 1 discloses a positive electrode active material in which trivalent Mn contained in $LiMn_2O_4$ is substituted with another metal. Specifically, Patent Literature 1 describes a secondary battery including, as a positive electrode active material, a manganese composite oxide having a spinel structure and represented by the composition formula $LiM_xMn_{2-x}O_4$ (M is one or more selected from Al, B, Cr, Co, Ni, Ti, Fe, Mg, Ba, Zn, Ge and Nb, and $0.01 \leq x \leq 1$). Patent Literature 1 specifically discloses an example of using $LiMn_{1.75}Al_{0.25}O_4$ as a positive electrode active material.

However, in the case where trivalent Mn is substituted with another element, there arises a problem of a decrease in the discharge capacity. $LiMn_2O_4$ causes a valence change of Mn represented by the following formula along with charge/discharge.

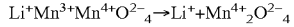

As shown in the above formula, $LiMn_2O_4$ contains trivalent Mn and tetravalent Mn, and the discharge is caused by change of trivalent Mn therein to tetravalence. Therefore, substitution of trivalent Mn with another element inevitably results in a decrease in the discharge capacity. That is, if the structural stability of a positive electrode active material is attempted to be enhanced to improve the reliability of a secondary battery, the decrease in the discharge capacity becomes remarkable. Therefore, the satisfaction of the both is difficult. Particularly a positive electrode active material exhibiting a high reliability in the discharge capacity of 110 mAh/g or larger is difficult to obtain.

A positive electrode active material in which trivalent Mn contained in $LiMn_2O_4$ is substituted with another element as described above constitutes a secondary battery having a so-called 4-V class electromotive force. On the other hand, as a technology in a different direction, studies are made in which a part of Mn of $LiMn_2O_4$ is substituted with Ni, Co, Fe, Cu, Cr or the like to raise the charge/discharge potential to thereby increase the energy density. These constitute batteries having a so-called 5-V class electromotive force. Hereinafter, description will be made by citing $LiNi_{0.5}Mn_{1.5}O_4$ as an example.

$LiNi_{0.5}Mn_{1.5}O_4$, ideally, causes a valence change represented by the following formula along with charge/discharge.

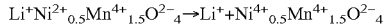

As shown in the above formula, $LiNi_{0.5}Mn_{1.5}O_4$ causes discharge by a change of divalent Ni to tetravalence. In such a way, use of Ni as an element participating in charge/discharge allows the operation at a high potential of 4.5 V or higher vs. lithium metal. Similarly in the case of substitution with Cr, a valence change of Cr from trivalance to tetravalence allows intercalation/deintercalation of lithium ions at a high potential of 4.5 V or higher vs. lithium metal. Patent Literatures 2 to 4 disclose examples of such positive electrode active materials. Use of such a positive electrode active material allows acquisition of an electromotive force of 4.5 V or higher vs. lithium and a high charge/discharge capacity.

CITATION LIST

Patent Literature

Patent Literature 1: JP2001-176557A
Patent Literature 2: JP09-147867A
Patent Literature 3: JP2002-158008A
Patent Literature 4: JP11-73962A

SUMMARY OF INVENTION

Technical Problem

However, the secondary batteries including a positive electrode active material described in Patent Literatures 2 to 4 still have room for improvement in the life aspect.

The present exemplary embodiment has an object to provide a novel positive electrode active material for a secondary battery.

Solution to Problem

A positive electrode active material for a secondary battery according to the present exemplary embodiment is represented by the following formula (I):

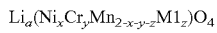 (I)

wherein 0<x, 0<y, 0<z, x+y+z<2, and 0≤a≤2; and M1 contains at least one selected from the group consisting of Na and Mg.

A positive electrode for a secondary battery according to the present exemplary embodiment includes the positive electrode active material for a secondary battery according to the present exemplary embodiment.

A secondary battery according to the present exemplary embodiment includes the positive electrode for a secondary battery according to the present exemplary embodiment.

A method for manufacturing a secondary battery according to the present exemplary embodiment includes applying the positive electrode active material for a secondary battery according to the present exemplary embodiment on a positive electrode current collector to thereby fabricate a positive electrode for a secondary battery, and assembling a secondary battery by using the positive electrode for a secondary battery.

Advantageous Effects of Invention

According to the present exemplary embodiment, a novel positive electrode active material for a secondary battery can be provided.

DESCRIPTION OF EMBODIMENT

Figure 1:
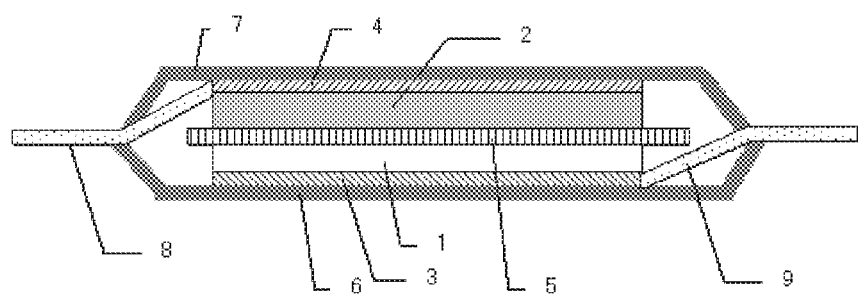
FIG. 1 is a cross-sectional diagram of a secondary battery according to the present exemplary embodiment.

[Positive Electrode Active Material for a Secondary Battery]

A positive electrode active material for a secondary battery according to the present exemplary embodiment is represented by the following formula (I):

$$Li_a(Ni_xCr_yMn_{2-x-y-z}M1_z)O_4 \quad (I)$$

wherein 0<x, 0<y, 0<z, x+y+z<2, and 0≤a≤2; and M1 contains at least one selected from Na and Mg.

The positive electrode active material for a secondary battery according to the present exemplary embodiment contains Cr and Ni as shown in the above formula (I), and contains at least one of Na and Mg.

In a 4-V class positive electrode active material, trivalent Mn participating in the charge/discharge of $LiMn_2O_4$ is substituted with another element to thereby enhance the stability of the crystal structure of the positive electrode active material, having achieved the life improvement. However, a further improvement is needed in order to increase the energy density per mass. That the positive electrode active material for a secondary battery according to the present exemplary embodiment contains Cr and Ni as shown in the above formula (I) achieves to make a secondary battery containing the positive electrode active material for a secondary battery according to the present exemplary embodiment to have a high capacity and a high energy density.

In the positive electrode active material for a secondary battery according to the present exemplary embodiment, enhancement of the crystallinity by incorporation of M1 in the above formula (I) achieves to make the life to be elongated. Particularly if at least one of Na and Mg as M1 is added and x, y and z in the above formula (I) are in a specific range described later, a further life elongation can be made. The positive electrode active material for a secondary battery according to the present exemplary embodiment, since bringing about a charge/discharge region at a high potential of 4.5 V or higher vs. Li metal, has an excellent property also from the viewpoint of the energy density.

The composition ratio x of Ni in the above formula (I) is 0<x. That the positive electrode active material contains Ni allows to provide a high voltage and a high capacity when being used for a secondary battery. The composition ratio x of Ni in the above formula (I) is preferably 0.25≤x≤0.5. When x is in the above range, the capacity retention rate can be improved. The composition ratio x of Ni in the above formula (I) is more preferably 0.3≤x≤0.49, and still more preferably 0.35≤x≤0.45.

The composition ratio y of Cr in the above formula (I) is 0<y. That the positive electrode active material contains Cr allows to easily provide a single phase spinel crystal structure, and provide a high capacity when being used for a secondary battery. The composition ratio y of Cr in the above formula (I) is preferably 0<y≤0.5. When y is in the above range, the capacity retention rate can be improved. The composition ratio y of Cr in the above formula (I) is more preferably 0.01≤y≤0.4, and still more preferably 0.05≤y≤0.3.

In the above formula (I), M1 contains at least one selected from the group consisting of Na and Mg. That the positive electrode active material contains M1 can achieve a life elongation of a secondary battery. That other elements are contained as minute amounts of components in M1 also can provide the similar effect. M1 can be at least one selected from the group consisting of Na, Mg, B, Al, Ti, Si, Li, Fe, Cu, Co, S and P, and contains at least one selected from the group consisting of Na and Mg. M1 is preferably at least one selected from the group consisting of Na and Mg.

The composition ratio z of M1 in the above formula (I) is 0<z. The composition ratio z of M1 in the above formula (I) is preferably 0<z≤0.1. When z is in the above range, the capacity retention rate can be improved. The composition ratio z of M1 in the above formula (I) is more preferably 0.001≤z≤0.1, and still more preferably 0.01≤z≤0.05, from the viewpoint of being capable of providing a sufficient improvement effect of the capacity retention rate. x, y and z in the above formula (I) satisfies a relationship of x+y+z<2.

The composition ratio a of Li in the above formula (I) changes depending on the intercalation/deintercalation of Li by charge/discharge. The composition ratio a of Li in the above formula (I) can change in the range of 0≤a≤2, can also change in the range of 0≤a≤1.2, and usually changes in the range of 0≤a≤1.

With respect to the compositions of Ni and Cr, in the case of $LiNi_{0.5}Mn_{1.5}O_4$ and $LiCrMnO_4$, ideally, only the valence changes of Ni and Cr occur in charge/discharge, and the intercalation/deintercalation of lithium occurs only in a high-potential region of 4.5 V or higher vs. lithium. In the case of a solid solution of these two positive electrode active materials, a positive electrode active material having a high voltage and a high capacity can be anticipated to be obtained. The composition of such a positive electrode active material is, ideally, 2x+y=1 in the above formula (I). However, in the case where other elements are added in consideration of the life elongation and the like of a secondary battery, even if there is a more or less deviation from this composition, the effect of a high voltage and a high capacity can be anticipated to be acquired similarly. Therefore, in the above formula (I), 2x+y is preferably 0.8≤2x+y≤1.2, more preferably 0.85≤2x+y≤1.15, and still more preferably 0.9≤2x+y≤1.1.

In the present exemplary embodiment, in the case where there is a small amount of oxygen defects in oxygen moieties in the above formula (I), and also in the case where a part of oxygen is substituted in a small amount with halogens such as fluorine and chlorine and chalcogens such as sulfur and selenium, the similar effect can be acquired.

Then, a fabrication method of a positive electrode active material for a secondary battery being a lithium manganese composite oxide according to the present exemplary embodiment will be described. A Li raw material usable includes $Li_2CO_3$, LiOH, $Li_2O$ and $Li_2SO_4$. Above all, $Li_2CO_3$ and LiOH are preferably used. A Mn raw material usable includes various types of Mn oxides such as electrolytic manganese dioxide (EMD), $Mn_2O_3$, $Mn_3O_4$ and CMD (chemical manganese dioxide), and $MnCO_3$ and $MnSO_4$. A nickel raw material usable includes NiO, $Ni(OH)_2$, $NiSO_4$ and $NiCO_3$. A Cr raw material usable includes $Cr_2O_3$ and $Cr(OH)_3$. A Mg raw material usable includes MgO and $Mg(OH)_2$. A Na raw material usable includes $Na_2O$ and NaOH. These may be used singly or concurrently in two or more.

These raw materials are weighed and mixed so as to have a target metal composition ratio. The mixing can be carried out by crushing and mixing by a ball mill, a jet mill or the like. An obtained mixed powder is calcined in air or oxygen at a temperature of 400° C. to 1,200° C. to thereby obtain a positive electrode active material for a secondary battery. The calcining temperature is preferably 400° C. to 1,000° C. That the calcining temperature is 400° C. or higher allows sufficient diffusion of each element. That the calcining temperature is 1,000° C. or lower allows prevention of a decrease in battery characteristics due to occurrence of oxygen defects.

The specific surface area of the positive electrode active material for a secondary battery according to the present exemplary embodiment is preferably 0.01 $m^2/g$ or larger and 3 $m^2/g$ or smaller. The specific surface area of 0.01 $m^2/g$ or larger can prevent a decrease in the charge/discharge rate property and the like of a secondary battery. By contrast, the specific surface area of 3 $m^2/g$ or smaller can make the use amount of a binder to be small and is advantageous from the viewpoint of the capacity density of a positive electrode for a secondary battery. The specific surface area is more preferably 0.05 $m^2/g$ or larger and 1 $m^2/g$ or smaller. Here, the specific surface area is a value measured by the BET method.

The positive electrode active material for a secondary battery according to the present exemplary embodiment can be used for either of a lithium secondary battery and a lithium ion secondary battery.

[Positive Electrode for a Secondary Battery]

A positive electrode for a secondary battery according to the present exemplary embodiment includes the positive electrode active material for a secondary battery according to the present exemplary embodiment. The positive electrode for a secondary battery according to the present exemplary embodiment can be fabricated by applying the positive electrode active material for a secondary battery according to the present exemplary embodiment on a positive electrode current collector. For example, a positive electrode for a secondary battery can be fabricated by mixing the positive electrode active material for a secondary battery according to the present exemplary embodiment, a conductivity imparting agent, and a binder, and applying the mixture on a positive electrode current collector. The conductivity imparting agent usable is, for example, a carbon material, and besides, a metal substance such as Al and a conductive oxide powder. These may be used singly or concurrently in two or more. The binder usable is a polyvinylidene fluoride (PVDF) and the like. The positive electrode current collector usable is a metal thin film containing Al or the like as a main component.

The addition amount of a conductivity imparting agent can be 1 to 10 mass %. Making the addition amount to be 1 mass % or larger allows holding sufficient conductivity. Making the addition amount to be 10 mass % or smaller allows raising the proportion of the mass of a positive electrode active material for a secondary battery, so that the capacity per mass can be raised. The addition amount of a binder can be 1 to 10 mass %. Making the addition amount to be 1 mass % or larger allows preventing the occurrence of electrode exfoliation. Making the addition amount to be 10 mass % or smaller allows raising the proportion of the mass of a positive electrode active material for a secondary battery, so that the capacity per mass can be raised.

[Secondary Battery]

A secondary battery according to the present exemplary embodiment includes the positive electrode for a secondary battery according to the present exemplary embodiment. The secondary battery according to the present exemplary embodiment includes, for example, the positive electrode for a secondary battery according to the present exemplary embodiment, and a negative electrode including a negative electrode active material capable of absorbing/releasing lithium. A separator which does not cause electric connection is interposed between the positive electrode for a secondary battery and the negative electrode; and the positive electrode for a secondary battery and the negative electrode are in the state of being immersed in a lithium ion-conductive electrolytic solution, and are hermetically housed in a battery case being an outer package.

One example of the constitution of a secondary battery according to the present exemplary embodiment is shown in FIG. 1. A positive electrode for a secondary battery is constituted such that a positive electrode active material layer 1 containing a positive electrode active material for a secondary battery according to the present exemplary embodiment is formed on a positive electrode current collector 3. A negative electrode is constituted such that a negative electrode active material layer 2 is formed on a negative electrode current collector 4. These positive electrode for a secondary battery and negative electrode are facingly arranged interposing a porous separator 5 in the state of being immersed in an electrolytic solution. These are housed in outer package laminates 6, 7. The positive electrode for a secondary battery is connected with a positive electrode tab 9 and the negative electrode is connected with a negative electrode tab 8.

Application of a voltage between the positive electrode for a secondary battery and the negative electrode provides deintercalation of lithium ions from the positive electrode active material for a secondary battery and adsorption of the lithium ions on the negative electrode active material to thereby make a charged state. An electric contact of the positive electrode for a secondary battery and the negative electrode outside the secondary battery provides, in the opposite direction to the charging, release of lithium ions from the negative electrode active material and adsorption of the lithium ions on the positive electrode active material for a secondary battery to thereby cause discharge.

An electrolytic solution usable is a solution in which a lithium salt is dissolved in a solvent. The solvent usable is cyclic carbonates such as propylene carbonate (PC), ethylene carbonate (EC), butylene carbonate (BC) and vinylene carbonate (VC), chain carbonates such as dimethyl carbonate (DMC), diethyl carbonate (DEC), ethyl methyl carbonate (EMC) and dipropyl carbonate (DPC), aliphatic carboxylate esters such as methyl formate, methyl acetate and ethyl propionate, γ-lactones such as γ-butyrolactone, chain ethers such as 1,2-diethoxyethane (DEE) and ethoxy-methoxyethane (EME), cyclic ethers such as tetrahydrofuran and 2-methyltetrahydrofuran, and aprotic organic solvents such as dimethyl sulfoxide, 1,3-dioxolane, formamide, acetoamide, dimethylformamide, dioxolane, acetonitrile, propylnitrile, nitromethane, ethylmonoglyme, phosphate triesters, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, N-methylpyrrolidone, fluorinated carbonates, fluorinated carboxylate esters and other fluorinated compounds. These solvents may be used singly or as a mixture of two or more.

The lithium salt includes, for example, $LiPF_6$, $LiAsF_6$, $LiAlCl_4$, $LiClO_4$, $LiBF_4$, $LiSbF_6$, $LiCF_3SO_3$, $LiC_4F_9CO_3$, $LiC_4F_9SO_3$, $LiC(CF_3SO_2)_3$, $LiN(CF_3SO_2)_2$, $LiN(C_2F_5SO_2)_2$, $LiB_{10}Cl_{10}$, lithium lower aliphatic carboxylates, lithium chloroborane, lithium tetraphenylborate, LiBr, LiI, LiSCN, LiCl, imides, quaternary ammonium salts and fluoroborates. These lithium salts may be used singly or concurrently in two or more.

The concentration of a lithium salt as an electrolyte can be, for example, 0.2 to 2 mol/l. The lithium salt concentration of 0.2 mol/L or higher allows acquiring a sufficient electric conductivity. The lithium salt concentration of 2 mol/L or lower allows suppressing an increase in the density and the viscosity. A polymer electrolyte may be used in place of an electrolytic solution.

The negative electrode active material usable is a material capable of absorbing/releasing lithium. The negative electrode active material usable is, for example, a carbon material such as graphite or amorphous carbon, Li metal, Si, Sn, Al, a Si oxide, a Sn oxide, a Ti oxide such as $Li_4Ti_5O_{12}$ and $TiO_2$, a V-containing oxide, an Sb-containing oxide, an Fe-containing oxide and a Co-containing oxide. These negative electrode active materials can be used singly or as a mixture of two or more.

The negative electrode can be fabricated by mixing the negative electrode active material, a conductivity imparting agent and a binder, and applying the mixture on the negative electrode current collector. The conductivity imparting agent usable is, for example, a carbon material, and besides, a powder such as a conductive oxide. These may be used singly or concurrently in two or more. The binder usable is a polyvinylidene fluoride (PVDF) and the like. The negative electrode current collector usable is a metal thin film containing Al, Cu or the like as a main component.

The secondary battery according to the present exemplary embodiment can be manufactured by being assembled by using the positive electrode for a secondary battery according to the present exemplary embodiment. For example, the positive electrode for a secondary battery according to the present exemplary embodiment and the negative electrode are facingly arranged and laminated interposing the separator in the state of being no electric contact. The separator usable is a microporous film including polyethylene, polypropylene (PP), polyimide, polyamide or the like.

A laminate obtained by facingly arranging and laminating the positive electrode for a secondary battery and the negative electrode interposing the separator is made into a cylindrical shape or a laminate shape. The laminate is housed in a battery case being an outer package. The laminate is immersed in the electrolytic solution so that both of the positive electrode active material for a secondary battery and the negative electrode active material contact with the electrolytic solution. A positive electrode tab and a negative electrode tab are respectively connected with and holding electric contacts with the positive electrode for a secondary battery and the negative electrode so that the positive electrode tab and the negative electrode tab are led outside the battery case. Thereafter, the battery case is hermetically closed to thereby fabricate the secondary battery.

The form of the secondary battery according to the present exemplary embodiment is not especially limited, and may be, for example, of a coin type, a laminate type or the like. The shape of the secondary battery according to the present exemplary embodiment is not limited. The positive electrode for a secondary battery and the negative electrode facingly arranged interposing the separator can take a shape of a winding type, a laminate type or the like. The shape of the secondary battery itself can be a square type cell, a cylinder type cell or the like.

EXAMPLES

Example 1

As a positive electrode active material for a secondary battery, $LiNi_{0.45}Cr_{0.1}Mn_{1.44}Mg_{0.01}O_4$ was prepared. Raw materials used were $MnO_2$, NiO, $Cr_2O_3$, $Li_2CO_3$ and $Mg(OH)_2$. These were weighed so as to become the above metal composition ratio, and crushed and mixed. The powder after the raw material mixing was calcined in oxygen at 800° C. for 8 hours, and thereafter slowly cooled. Thereby, the positive electrode active material for a secondary battery was prepared. The positive electrode active material for a secondary battery was evaluated by X-ray diffraction, and all peaks acquired could be assigned to a spinel structure. The positive electrode active material for a secondary battery was thereby confirmed to have a nearly single phase spinel structure.

The positive electrode active material for a secondary battery and a carbon as a conductivity imparting agent were mixed. The mixture was dispersed in N-methylpyrrolidone in which a polyvinylidene fluoride (PVDF) as a binder was dissolved to thereby make a slurry. The mass ratio of the positive electrode active material for a secondary battery, the conductivity imparting agent and the binder was made to be 92/4/4. The slurry was applied on an Al current collector. Thereafter, the slurry was dried under vacuum for 12 hours to thereby make a positive electrode material for a secondary battery. The positive electrode material for a secondary battery was pressure molded at 3 t/cm². Thereby, a positive electrode for a secondary battery was fabricated.

(Evaluation of the Discharge Capacity)

Figure 2:
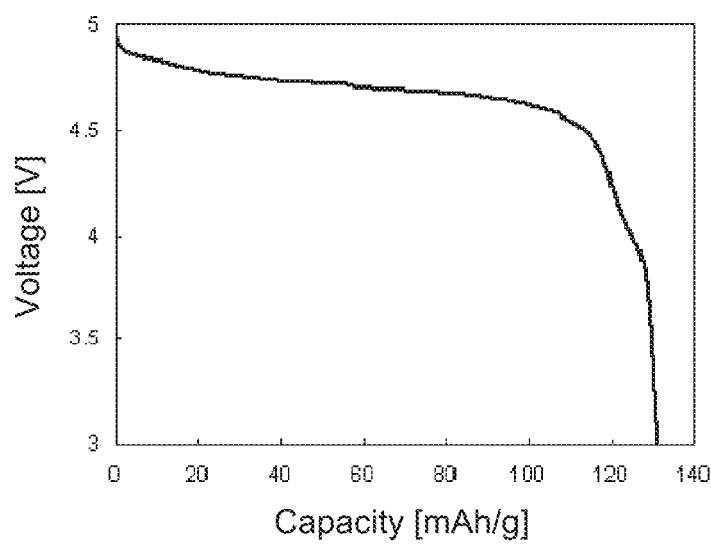
FIG. 2 is a diagram showing a discharge curve of a secondary battery using a positive electrode active material according to the present exemplary embodiment.

The positive electrode for a secondary battery was cut out into a circle of 12 mm in diameter. By using the positive electrode for a secondary battery, a separator of 18 mm in diameter, and a Li metal as a negative electrode of 15 mm in diameter and 1.4 mm in thickness, a coin type secondary battery of the 2320 type was fabricated. On the secondary battery, charging was carried out at a charging rate of 0.05 C to 5.0 V, and discharging was carried out at a rate of 0.05 C to 3 V. The discharge capacity at this time is shown in Table 1. The discharge curve at this time is shown in FIG. 2. As shown in FIG. 2, the secondary battery using the positive electrode active material for a secondary battery according to the present Example could provide a high capacity at 4.5 V or higher vs. lithium.

(Evaluation of the Capacity Retention Rate)

The positive electrode for a secondary battery was cut out into 20 mm long and 20 mm wide. A negative electrode active material used for a negative electrode was a graphite. The negative electrode active material was dispersed in N-methylpyrrolidone in which a polyvinylidene fluoride (PVDF) as a binder was dissolved to thereby make a slurry. The mass ratio of the negative electrode active material and the binder was 92/8. The slurry was applied on a Cu current collector. Thereafter, the slurry was dried under vacuum for 12 hours to thereby make a negative electrode material. The negative electrode material was pressure molded at 1 t/cm². Thereby, a negative electrode was fabricated. The negative electrode was cut out into 20 mm long and 20 mm wide.

A separator used was a film of PP. The positive electrode for a secondary battery and the negative electrode were facingly arranged interposing the separator. This was arranged in a laminate, in which an electrolytic solution was filled and which was hermetically closed. Thereby, a laminate type secondary battery was fabricated. The electrolytic solution used was a solution in which 1 mol/l of $LiPF_6$ being an electrolyte was dissolved in a solvent (EC (ethylene carbonate)/DMC (dimethyl carbonate)=3/7 (vol %)).

The evaluation of the capacity retention rate was carried out by the following method. First, a constant-current charging was carried out at a charging rate of 1 C to 4.9 V; and after the voltage reached 4.9 V, a charging was carried out at a constant voltage, and the entire charging time was regulated to be 2.5 hours. After the completion of the charging, a discharging was carried out at a 1 C constant current to 3 V. This charge/discharge was repeated 200 times in a constant-temperature bath of 45° C. The ratio of a discharge capacity after the 200 times and a discharge capacity at the first time was defined as a capacity retention rate after 200 cycles. The evaluation result of the capacity retention rate is shown in Table 1.

Examples 2 to 28 and Comparative Examples 1 to 5

Positive electrode active materials for a secondary battery having compositions shown in Table 1 were prepared by the similar method as in Example 1, and evaluated as in Example 1. The evaluation results are shown in Table 1. A raw material used of Na was NaOH; that of B, $B_2O_3$; that of Al, $Al(OH)_3$; that of Si, SiO; and that of Ti, $TiO_2$. All the positive electrode active materials for a secondary battery of the Examples and the Comparative Examples were evaluated by X-ray diffraction, and all peaks acquired for all the positive electrode active materials for a secondary battery thereof could be assigned to a spinel structure. Thereby, all the positive electrode active materials for a secondary battery were confirmed to have a nearly single phase spinel structure.

TABLE 1

| Positive Electrode Active Material for Secondary Battery | Discharge Capacity [mAh/g] | Capacity Retention Rate after 200 Cycles at 45° C. [%] |
|---|---|---|
| Example 1 | $LiNi_{0.45}Cr_{0.1}Mn_{1.44}Mg_{0.01}O_4$ | 131 | 76 |
| Example 2 | $LiNi_{0.45}Cr_{0.1}Mn_{1.43}Mg_{0.02}O_4$ | 130 | 80 |
| Example 3 | $LiNi_{0.45}Cr_{0.1}Mn_{1.4}Mg_{0.05}O_4$ | 128 | 79 |
| Example 4 | $LiNi_{0.45}Cr_{0.1}Mn_{1.37}Mg_{0.08}O_4$ | 125 | 76 |
| Example 5 | $LiNi_{0.45}Cr_{0.1}Mn_{1.35}Mg_{0.1}O_4$ | 120 | 76 |
| Example 6 | $LiNi_{0.49}Cr_{0.02}Mn_{1.47}Mg_{0.02}O_4$ | 130 | 76 |
| Example 7 | $LiNi_{0.4}Cr_{0.2}Mn_{1.38}Mg_{0.02}O_4$ | 130 | 79 |
| Example 8 | $LiNi_{0.3}Cr_{0.4}Mn_{1.28}Mg_{0.02}O_4$ | 129 | 78 |
| Example 9 | $LiNi_{0.25}Cr_{0.5}Mn_{1.23}Mg_{0.02}O_4$ | 125 | 78 |
| Example 10 | $LiNi_{0.25}Cr_{0.45}Mn_{1.28}Mg_{0.02}O_4$ | 122 | 78 |
| Example 11 | $LiNi_{0.45}Cr_{0.1}Mn_{1.445}Na_{0.005}O_4$ | 133 | 74 |
| Example 12 | $LiNi_{0.45}Cr_{0.1}Mn_{1.44}Na_{0.01}O_4$ | 132 | 78 |
| Example 13 | $LiNi_{0.45}Cr_{0.1}Mn_{1.43}Na_{0.02}O_4$ | 130 | 77 |
| Example 14 | $LiNi_{0.45}Cr_{0.1}Mn_{1.42}Na_{0.03}O_4$ | 127 | 76 |
| Example 15 | $LiNi_{0.45}Cr_{0.1}Mn_{1.4}Na_{0.05}O_4$ | 124 | 75 |
| Example 16 | $LiNi_{0.4}Cr_{0.2}Mn_{1.38}Na_{0.02}O_4$ | 130 | 77 |
| Example 17 | $LiNi_{0.45}Cr_{0.1}Mn_{1.41}Mg_{0.02}Li_{0.02}O_4$ | 127 | 81 |
| Example 18 | $LiNi_{0.45}Cr_{0.1}Mn_{1.41}Mg_{0.02}B_{0.02}O_4$ | 128 | 78 |
| Example 19 | $LiNi_{0.45}Cr_{0.1}Mn_{1.41}Mg_{0.02}Al_{0.02}O_4$ | 129 | 81 |
| Example 20 | $LiNi_{0.45}Cr_{0.1}Mn_{1.41}Mg_{0.02}Si_{0.02}O_4$ | 131 | 80 |
| Example 21 | $LiNi_{0.45}Cr_{0.1}Mn_{1.38}Mg_{0.02}Ti_{0.05}O_4$ | 131 | 82 |
| Example 22 | $LiNi_{0.2}Cr_{0.1}Mn_{1.68}Mg_{0.02}O_4$ | 113 | 75 |
| Example 23 | $LiNi_{0.55}Cr_{0.05}Mn_{1.38}Mg_{0.02}O_4$ | 120 | 65 |
| Example 24 | $LiNi_{0.2}Cr_{0.5}Mn_{1.28}Mg_{0.02}O_4$ | 117 | 58 |
| Example 25 | $LiNi_{0.3}Cr_{0.6}Mn_{1.08}Mg_{0.02}O_4$ | 115 | 56 |
| Example 26 | $LiNi_{0.2}Cr_{0.8}Mn_{0.98}Mg_{0.02}O_4$ | 107 | 53 |
| Example 27 | $LiNi_{0.45}Cr_{0.1}Mn_{1.3}Mg_{0.15}O_4$ | 85 | 61 |
| Example 28 | $LiNi_{0.45}Cr_{0.1}Mn_{1.3}Na_{0.15}O_4$ | 65 | 64 |
| Comparative Example 1 | $LiNi_{0.5}Mn_{1.5}O_4$ | 130 | 68 |
| Comparative Example 2 | $LiNi_{0.45}Cr_{0.1}Mn_{1.45}O_4$ | 132 | 67 |
| Comparative Example 3 | $LiNi_{0.4}Cr_{0.2}Mn_{1.4}O_4$ | 133 | 65 |
| Comparative Example 4 | $LiNi_{0.3}Cr_{0.4}Mn_{1.3}O_4$ | 132 | 64 |
| Comparative Example 5 | $LiNi_{0.25}Cr_{0.5}Mn_{1.25}O_4$ | 131 | 64 |

As shown in Examples 1 to 28, according to the present exemplary embodiment, novel positive electrode active materials for a secondary battery were confirmed to be provided. Particularly in Examples 1 to 21 satisfying $0.25 \leq x \leq 0.5$, $0 < y \leq 0.5$ and $0 < z \leq 0.1$ in the above formula (I), the capacity retention rate was confirmed to be improved. It is considered that this condition enhanced the crystallinity of the positive electrode active material for a secondary battery, and had effects of decreases in the elution of the constituting elements, in the oxygen release on the surface of the positive electrode active material for a secondary battery, and in the decomposition of the electrolytic solution at the interface of the positive electrode active material for a secondary battery, and the like. With respect to the substitution amount of at least one of Na and Mg, the effects of the high capacity and the improvement of the capacity retention rate could be acquired in the range of z in the above formula (I) being $0 < z \leq 0.1$.

As described hitherto, according to the present exemplary embodiment, a novel positive electrode active material for a secondary battery and a secondary battery using the same can be provided.

The present application claims the priority based on Japanese Patent Application No. 2010-274750, filed on Dec. 9, 2010, the entire of the disclosure of which is hereby incorporated.

Hitherto, the present invention has been described by reference to the exemplary embodiment and the Examples, but the present invention is not limited to the exemplary embodiment and the Examples. Various changes to be understood by those skilled in the art may be made within the scope of the present invention on the constitution and the detail of the present invention.

INDUSTRIAL APPLICABILITY

The positive electrode active material for a secondary battery and the secondary battery according to the present exemplary embodiment are suitably used for cell phones, laptop personal computers, electric cars, electric bicycles, electric motorcycles, uninterruptible power sources, electric tools, digital cameras, portable musical instruments and the like.

REFERENCE SIGNS LIST 1 positive electrode active material layer
2 negative electrode active material layer
3 positive electrode current collector
4 negative electrode current collector
5 porous separator
6, 7 outer package laminate
8 negative electrode tab
9 positive electrode tab

The invention claimed is:

1. A positive electrode active material for a secondary battery, represented by the following formula (I):

$$Li_a(Ni_xCr_yMn_{2-x-y-z}M1_z)O_4 \qquad (I)$$

wherein $0<x$, $0<y$, $0<z\leq0.1$, $x+y+z<2$, and $0\leq a\leq2$; and M1 comprises at least Na.

2. The positive electrode active material for a secondary battery according to claim 1, wherein $0.25\leq x\leq0.5$ in the formula (I).

3. The positive electrode active material for a secondary battery according to claim 1, wherein $0<y\leq0.5$ in the formula (I).

4. The positive electrode active material for a secondary battery according to claim 1, wherein $0\leq a\leq1$ in the formula (I).

5. The positive electrode active material for a secondary battery according to claim 1, wherein $0.8\leq 2x+y\leq1.2$ in the formula (I).

6. The positive electrode active material for a secondary battery according to claim 1, wherein in the formula (I), M1 further comprises at least one selected from the group consisting of Mg, B, Al, Ti, Si, Li, Fe, Cu, Co, S and P.

7. A positive electrode for a secondary battery, comprising the positive electrode active material for a secondary battery according to claim 1.

8. A secondary battery comprising the positive electrode for a secondary battery according to claim 7.

9. A method for manufacturing a secondary battery, comprising:
applying the positive electrode active material for a secondary battery according to claim 1 on a positive electrode current collector to thereby fabricate a positive electrode for a secondary battery; and
assembling the secondary battery by using the positive electrode for a secondary battery.

* * * * *

UNITED STATES PATENT AND TRADEMARK OFFICE
CERTIFICATE OF CORRECTION

PATENT NO. : 8,877,090 B2  Page 1 of 1
APPLICATION NO. : 13/824075
DATED : November 4, 2014
INVENTOR(S) : Takehiro Noguchi et al.

It is certified that error appears in the above-identified patent and that said Letters Patent is hereby corrected as shown below:

In the Specification

Column 2, Line 36: Delete "trivalance" and insert -- trivalence --

Column 7, Line 25: Delete "mol/1." and insert -- mol/L. --

Signed and Sealed this
Twenty-second Day of September, 2015

Michelle K. Lee
*Director of the United States Patent and Trademark Office*